US011464235B2

(12) United States Patent
Peng et al.

(10) Patent No.: US 11,464,235 B2
(45) Date of Patent: Oct. 11, 2022

(54) METHOD FOR IMPROVING TENDERNESS OF RAW MEAT AND MEAT PRODUCT BY MECHANICAL VIBRATION

(71) Applicant: Nanjing Agricultural University, Suzhou (CN)

(72) Inventors: Yingbo Peng, Jiangsu (CN); Yawei Zhang, Jiangsu (CN); Lu Yang, Jiangsu (CN); Chao Wang, Jiangsu (CN); Zengqi Peng, Jiangsu (CN)

(73) Assignee: Nanjing Agricultural University, Jiangsu (CN)

( * ) Notice: Subject to any disclaimer, the term of this patent is extended or adjusted under 35 U.S.C. 154(b) by 0 days.

(21) Appl. No.: 17/135,507

(22) Filed: Dec. 28, 2020

(65) Prior Publication Data

US 2021/0315219 A1 Oct. 14, 2021

(30) Foreign Application Priority Data

Apr. 13, 2020 (CN) .......................... 202010287382.6

(51) Int. Cl.
*A22C 9/00* (2006.01)
(52) U.S. Cl.
CPC ...................... *A22C 9/00* (2013.01)
(58) Field of Classification Search
CPC ............ A22C 9/00; A22C 9/002; A23L 13/70
USPC ....................................................... 452/141
See application file for complete search history.

(56) References Cited

U.S. PATENT DOCUMENTS

| 3,711,896 A * | 1/1973 | Guberman ............... A22C 9/00 |
| | | 452/141 |
| 7,205,016 B2 * | 4/2007 | Garwood ................ A23L 13/00 |
| | | 426/118 |
| 8,047,903 B1 * | 11/2011 | Schiff .................... B64D 13/06 |
| | | 454/71 |

FOREIGN PATENT DOCUMENTS

DE 10 2007041591 A1 * 5/2009

* cited by examiner

*Primary Examiner* — Richard T Price, Jr.
(74) *Attorney, Agent, or Firm* — Cesari & McKenna, LLP

(57) ABSTRACT

The present disclosure discloses a method for improving tenderness of raw meat and meat products by mechanical vibration. In the method, the raw meat is vibrated to loosen meat tissue and improve meat tenderness, or is vibrated during curing to reduce curing time while improving the tenderness. The method mechanically vibrates the raw meat to loosen the structure of the raw meat, and ultimately improves the meat tenderness; or vibrates during curing to improve the tenderness while reducing the curing time, effectively ensuring the sensory meat quality. The method of the present disclosure not only effectively solves the problem of the tenderness of meat and meat products, but also improves sensory quality and safety thereof, enables wider popularization and utilization of meat and meat products, and directly increases economic benefits of enterprises and opens up a new way for future development thereof.

3 Claims, 1 Drawing Sheet

METHOD FOR IMPROVING TENDERNESS OF RAW MEAT AND MEAT PRODUCT BY MECHANICAL VIBRATION

CROSS REFERENCE TO RELATED APPLICATIONS

The application claims priority to Chinese Application No. 202010287382.6, filed on Apr. 13, 2020, which is hereby incorporated by reference in its entirety.

TECHNICAL FIELD

The present disclosure relates to the technical field of food processing, and in particular to a new method for improving tenderness of raw meat and meat products by mechanical vibration. The method is a method for improving the tenderness of the products through the principle of vibration fatigue and failure. This method is suitable for yak meat, beef, lamb, poultry, etc.

BACKGROUND

Tenderness is an important indicator of meat and the main basis for consumers to judge meat quality. This is an important factor in determining the eating quality of meat products and a major factor restricting market competitiveness thereof. The content and properties of connective tissue in meat and the structure and state of myofibrillar protein are the main factors affecting meat tenderness. For processors, the tenderness of raw meat determines the grade and value of a final product. Therefore, it is necessary to tenderize the raw meat and improve meat quality by scientific means, in order to achieve better eating effect, and further increase the value of the product.

The mechanical tenderization method using external force is the earliest artificial tenderization technique. In the method, external force is used to separate actin and myosin, elongate the sarcomere, and connective tissue such as the sarcolemma becomes loose and broken due to the impact of external force, which will eventually make the meat soft. Commonly used methods are hammering and beating method and mechanical tumbling method. The former is only suitable for household and small-scale production, while the latter is the most used in meat processing. Combining processes such as curing and chopping can improve meat tenderness and increase the water retention of meat and improve meat quality, with remarkable effect. However, these two methods of mechanical tenderization with the help of external force not only take a long time and have poor results, but also destroy the tissue state of the meat, which will affect the sensory attributes of a product. At present, high hydrostatic pressure treatment (HPP), hydrodynamic pressure treatment (HDP) and shock waves are also used to improve the meat tenderness; especially the research and development of packaging materials suitable for shock waves and explosives that generate shock waves, storage location thereof, and equipment that can meet the needs of modern industrialization have severely restricted use of shock waves in tenderization.

Yak beef has a plurality of characteristics, such as high protein, low fat, low calorie, abundant amino acid types, and rich carotene content, and is widely favored by consumers. The Ministry of Agriculture further defines the yak beef as a "green food". The unique quality of yak meat is mostly affected by natural conditions, but it is precisely because of the special geographical environment conditions that yak grows and slaughter age is often very large, resulting in that yak meat is harder than ordinary beef, and the taste after processing is somewhat different from that of ordinary beef. In addition, after slaughter, livestock and poultry need to be fully matured to remove the acid before the livestock and poultry meat has good tenderness. However, it takes a long time to mature and remove the acid, substantially increasing the cost and processing time of industrialized meat slaughter and production. Therefore, it is necessary to provide a new method for improving the tenderness of raw meat and meat products.

SUMMARY

An objective of the present disclosure is to solve the technical problem of poor quality caused by hard meat quality and poor tenderness of raw meat and meat products, and to provide a method for improving tenderness of raw meat and meat products by mechanical vibration. The method can effectively improve the tenderness of meat and meat products; in addition, the method substantially improves sensory attributes and safety of the meat, enables wider popularization and utilization of the meat and meat products, and directly increases economic benefits of enterprises and opens up a new way for future development thereof.

The objective of the present disclosure can be achieved by the following technical solution:

a method for improving tenderness of raw meat and meat products by mechanical vibration is provided, where the raw meat is vibrated to loosen meat tissue and improve meat tenderness, or is vibrated during curing to reduce curing time while improving the tenderness; where the vibration is conducted under the following conditions:

raw meat vibration: frequency 30-50 Hz, amplitude 1-4 mm, and vibration time 0.5-3 h;

vibration during curing: frequency 30-50 Hz, amplitude 1-4 mm, vibration time 0.5-2 h.

The raw meat is yak meat, beef, lamb or poultry.

Vibration fatigue is a phenomenon of fatigue failure caused by the frequency distribution (vibration frequency) of the dynamic alternating load on the tissue and structure of an object having an intersection with or approaching the natural frequency distribution of the structure, which makes tissue structure resonate. If raw meat and meat products change original muscle tissue (such as muscle fiber structure) thereof under vibrational excitation, vibration failure will occur. The sarcolemmal connective tissue or myofibril of the meat can be destroyed by mechanical vibration. The principle is to give the meat a cyclic load, which first produces local permanent damage at a certain point or certain points in the muscle tissue, and forms microcracks and expand after a certain number of cycles, i.e., vibration fatigue and failure of the meat. Through this mechanical vibration fatigue damage, connective tissues such as myofibrils and sarcolemma are ruptured and broken, thereby improving the tenderness of the raw meat and meat products.

The experimental results show that the method of the present disclosure mechanically vibrates the raw meat to loosen the structure thereof, and ultimately improves the meat tenderness; or vibrates during curing to improve the tenderness while reducing the curing time, effectively ensuring the sensory meat quality.

The present disclosure has the following beneficial effects:

The method of the present disclosure not only effectively solves the problem of the tenderness of the meat and meat products through physical methods, but also improves sensory attributes and safety of the meat, enables wider popularization and utilization of the meat and meat products, and directly increases economic benefits of enterprises and opens up a new way for future development thereof.

BRIEF DESCRIPTION OF THE DRAWINGS

In the FIGURES, FIG. 1A: control (standing) group, FIG. 1B: vibration group, FIG. 1C: standing group with curing agent, FIG. 1D: vibration group with curing agent.

DETAILED DESCRIPTION

Figures 1A, 1B:
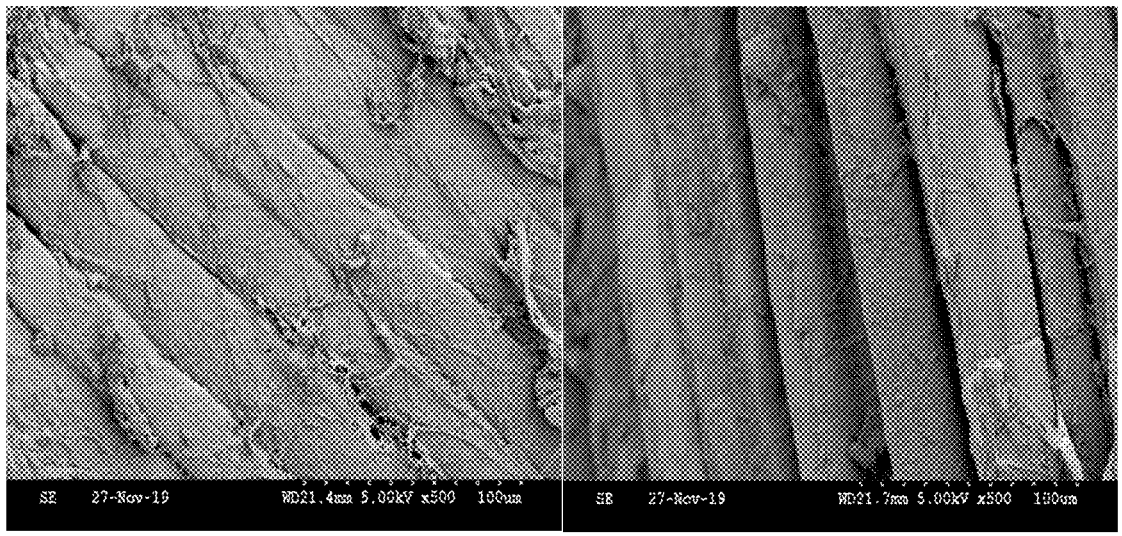
FIGS. 1A-1D is a scanning electron microscope (SEM) image (500×) of myofibrils of the longissimus dorsi muscle of a yak under different treatment conditions.

The present disclosure will be described in detail below in conjunction with embodiments. Technical solution for improving the tenderness of raw meat or seasoned meat through vibration (take yak meat as an example):

Embodiment 1: Raw Cut Yak Steak

Yak meat was cleaned, shaped, sliced, vibrated, and then quick-frozen to produce raw cut steaks. The specific process was as follows:

(1) Raw material selection and finishing: Healthy and disease-free fresh yak meat was selected to remove surface fat and debris, washed and cut into 1.5-2 cm thick meat pieces.

(2) Vibration: The cut meat was directly placed on the vibration equipment, and vibrated at a frequency of 40 Hz and an amplitude of 3 mm for 2.5 h.

(3) Packaging: The meat pieces were taken out, drained, and vacuum-packed into raw cut yak steaks at 0-4° C.

Embodiment 2 Seasoned Meat Products

Firstly, yak meat was cleaned, shaped, cured, vibrated, and then quick-frozen to produce various quick-frozen seasoned meat products. The specific process was as follows:

(1) Raw materials selection and finishing: Healthy and disease-free fresh yak meat was selected to remove surface fat and debris, washed and cut into 1.5-2.5 cm thick meat pieces.

(2) Curing: The processed meat was mixed with curing agent and put into a ziplock bag. Components in the curing agent were proportioned by weight: 17 parts of edible salt, 0.6 parts of monosodium glutamate, 0.007 parts of sodium nitrite, 0.022 parts of sodium D-isoascorbate, and 0.16 parts of spices, where components of the spices are proportioned by weight: 2 parts of ginger essential oil, 3 parts of zanthoxylum oil, 3 parts of cinnamon essential oil, 6 parts of cumin essential oil, 2 parts of nutmeg essential oil, and 3 parts of clove essential oil. The formula of the curing agent is not limited thereto, and the formula and dosage thereof can be adjusted as required in the actual operation process, and other curing agents can also be used.

(3) Vibration: The ziplock bag with meat piece was placed on the vibration equipment, and vibrated at a frequency of 40 Hz and an amplitude of 3 mm for 1.5 h.

(4) Packaging and quick freezing: The meat pieces were taken out, drained, and vacuum-packed at 0-4° C. Using quick-freezing technology, the frozen food should reach a core temperature below −18 to −15° C.

(5) Heating and eating: After thawing at room temperature, the product can be shredded or diced according to personal preference, and fried according to the general household frying method before eating. The product can also be roasted and eaten.

Embodiment 3: Raw Cut Yak Steak

Yak meat was cleaned, shaped, sliced, vibrated, and then quick-frozen to produce raw cut steaks. The specific process was as follows:

(1) Raw materials selection and finishing: Healthy and disease-free fresh yak meat was selected to remove surface fat and debris, washed and cut into 1.5-2 cm thick meat pieces.

(2) Vibration: The cut meat was directly placed on the vibration equipment, and vibrated at a frequency of 30 Hz and an amplitude of 2 mm for 3 h.

(3) Packaging: The meat pieces were taken out, drained, and vacuum-packed into raw cut yak steaks at 0-4° C.

Embodiment 4 Seasoned Meat Products

Firstly, yak meat was cleaned, shaped, cured, vibrated, and then quick-frozen to produce various quick-frozen seasoned meat products. The specific process was as follows:

(1) Raw materials selection and finishing: Healthy and disease-free fresh yak meat was selected to remove surface fat and debris, washed and cut into 1.5-2.5 cm thick meat pieces.

(2) Curing: The processed meat was mixed with curing agent and put into a ziplock bag. Components in the curing agent were proportioned by weight: 17 parts of edible salt, 0.6 parts of monosodium glutamate, 0.007 parts of sodium nitrite, 0.022 parts of sodium D-isoascorbate, and 0.16 parts of spices, where components of the spices are proportioned by weight: 2 parts of ginger essential oil, 3 parts of zanthoxylum oil, 3 parts of cinnamon essential oil, 6 parts of cumin essential oil, 2 parts of nutmeg essential oil, and 3 parts of clove essential oil.

(3) Vibration: The ziplock bag with meat piece was placed on the vibration equipment, and vibrated at a frequency of 30 Hz and an amplitude of 2 mm for 2 h.

(4) Packaging and quick freezing: The meat pieces were taken out, drained, and vacuum-packed at 0-4° C. Using quick-freezing technology, the frozen food should reach a core temperature below −18 to −15° C.

(5) Heating and eating: After thawing at room temperature, the product can be shredded or diced according to personal preference, and fried according to the general household frying method before eating. The product can also be roasted and eaten.

Embodiment 5: Raw Cut Yak Steak

Yak meat was cleaned, shaped, sliced, vibrated, and then quick-frozen to produce raw cut steaks. The specific process was as follows:

(1) Raw materials selection and finishing: Healthy and disease-free fresh yak meat was selected to remove surface fat and debris, washed and cut into 1.5-2 cm thick meat pieces.

(2) Vibration: The cut meat was directly placed on the vibration equipment, and vibrated at a frequency of 50 Hz and an amplitude of 4 mm for 1 h.

(3) Packaging: The meat pieces were taken out, drained, and vacuum-packed into raw cut yak steaks at 0-4° C.

Embodiment 6 Seasoned Meat Products

Firstly, yak meat was cleaned, shaped, cured, vibrated, and then quick-frozen to produce various quick-frozen seasoned meat products. The specific process was as follows:

(1) Raw materials selection and finishing: Healthy and disease-free fresh yak meat was selected to remove surface fat and debris, washed and cut into 1.5-2.5 cm thick meat pieces.

(2) Curing: The processed meat was mixed with curing agent and put into a ziplock bag. Components in the curing agent were proportioned by weight: 17 parts of edible salt, 0.6 parts of monosodium glutamate, 0.007 parts of sodium nitrite, 0.022 parts of sodium D-isoascorbate, and 0.16 parts of spices, where components of the spices are proportioned by weight: 2 parts of ginger essential oil, 3 parts of zanthoxylum oil, 3 parts of cinnamon essential oil, 6 parts of cumin essential oil, 2 parts of nutmeg essential oil, and 3 parts of clove essential oil.

(3) Vibration: The ziplock bag with meat piece was placed on the vibration equipment, and vibrated at a frequency of 50 Hz and an amplitude of 4 mm for 0.5 h.

(4) Packaging and quick freezing: The meat pieces were taken out, drained, and vacuum-packed at 0-4° C. Using quick-freezing technology, the frozen food should reach a core temperature below −18 to −15° C.

(5) Heating and eating: After thawing at room temperature, the product can be shredded or diced according to personal preference, and fried according to the general household frying method before eating. The product can also be roasted and eaten.

Test Results

A control (standing) group, a vibration group (Embodiment 1), a standing group with curing agent, and a vibration group with curing agent (Embodiment 2) were set up. In the control (standing) group, other conditions were the same as those in Embodiment 1 except for the non-vibration standing treatment; in the vibration group with curing agent, other conditions were the same as those in Embodiment 2 except for the non-vibration standing treatment. Among them, the myofibril fragmentation index of the vibration group was reduced by about 20% compared with that of the control (standing) group. The following is the change of the yak-colored shear force value:

| Age/year | Control group/N | Vibration group/N |
|---|---|---|
| 3-4 | 50-70 | 40-50 |
| 6-7 | 80-95 | 50-65 |
| 9 | 100-120 | 70-90 |

Figures 1C, 1D:
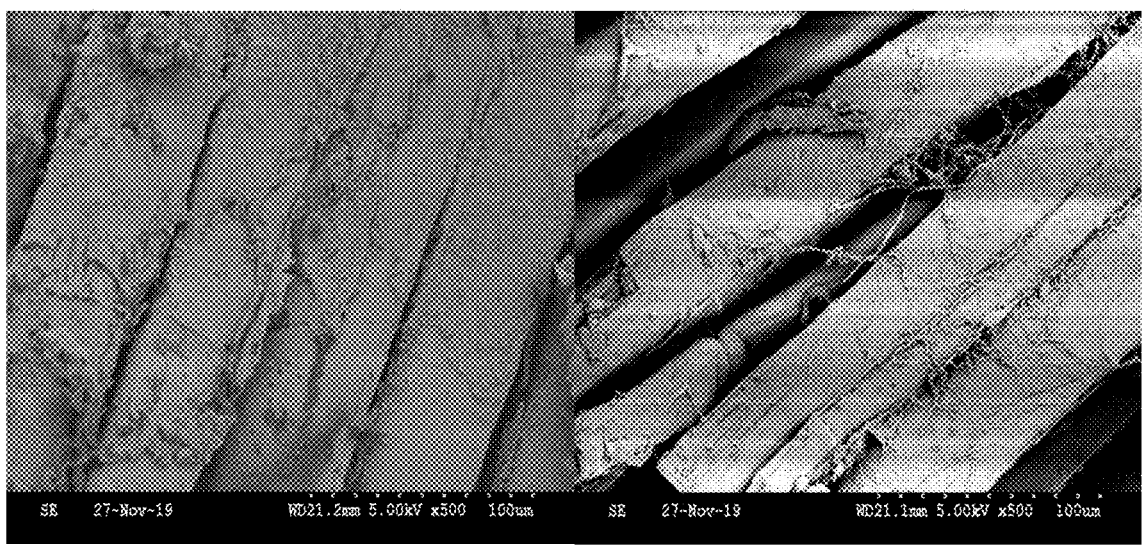

Ultrastructural changes of each treatment group are shown in FIGS. 1A-1D.

The results show that the method of the present disclosure mechanically vibrates the raw meat to loosen the structure of the raw meat, and ultimately improves the meat tenderness; or vibrates during curing to improve the tenderness while reducing the curing time, effectively ensuring the sensory meat quality. It is shown that the method of the present disclosure not only effectively solves the problem of the tenderness of meat and meat products, but also improves sensory quality and safety thereof, enables wider popularization and utilization of meat and meat products, and directly increases economic benefits of enterprises and opens up a new way for future development thereof.

What is claimed is:

1. A method for improving tenderness of raw meat and meat products by mechanical vibration, the method comprising the steps of:
   (1) cutting the raw meat into 1.5-2 cm thick meat pieces;
   (2) vibrating the raw meat to loosen meat tissue and improve meat tenderness, or is vibrating the raw meat during curing in a container to reduce curing time while improving the tenderness; the vibrating being conducted under the following conditions:
   raw meat vibration: frequency 30-50 Hz, amplitude 1-4 mm, and vibration time 0.5-3 h;
   vibration during curing: frequency 30-50 Hz, amplitude 1-4 mm, vibration time 0.5-2 h; and
   (3) packaging the vibrated raw meat at 0-4° C.; or taking the vibrated cured meat out of the container, draining water off, packaging the vibrated cured meat at 0-4° C., and quick-freezing the packaged vibrated cured meat at a temperature of −18 to −15° C.

2. The method according to claim 1, wherein the raw meat is yak meat, beef, lamb or poultry.

3. The method according to claim 1, wherein the raw meat during curing is cured with a composition that contains the following ingredients by weight: 17 parts of edible salt, 0.6 parts of monosodium glutamate, 0.007 parts of sodium nitrite, 0.022 parts of sodium D-isoascorbate, and 0.16 parts of spices in which the spices include, by weight: 2 parts of ginger essential oil, 3 parts of zanthoxylum oil, 3 parts of cinnamon essential oil, 6 parts of cumin essential oil, 2 parts of nutmeg essential oil, and 3 parts of clove essential oil.

* * * * *